US006120377A

United States Patent [19]

McGinnis, Sr. et al.

[11] Patent Number: 6,120,377

[45] Date of Patent: Sep. 19, 2000

[54] METHOD OF PLAYING A WAGERING GAME

[76] Inventors: Richard G. McGinnis, Sr., 203 S. 3rd St., Lewisberg, Pa. 17837; Richard G. McGinnis, Jr., 117 W. 58th St., Apartment 5A, New York, N.Y. 10019; Adam Politzer, 14 Stone Creek La., Bryn Mawr, Pa. 19010; Charles McGinnis, 203 S. 3rd St., Lewisberg, Pa. 17837

[21] Appl. No.: 09/042,770

[22] Filed: Mar. 17, 1998

Related U.S. Application Data

[60] Provisional application No. 60/040,981, Mar. 17, 1997.

[51] Int. Cl.[7] .............................. A63F 9/24; G06F 19/00

[52] U.S. Cl. ................................................ 463/20; 463/13

[58] Field of Search ................................ 463/13, 20, 21, 463/31, 37; 273/146, 138.1, 142 A, 138 R

[56] References Cited

U.S. PATENT DOCUMENTS

| | | | |
|---|---|---|---|
| Re. 34,244 | 5/1993 | Hagiwara | 273/138 A |
| 3,865,368 | 2/1975 | Grazebrook | 273/1 E |
| 4,506,890 | 3/1985 | Murry | 273/138 A |
| 5,033,744 | 7/1991 | Bridgeman et al. | 273/85 CP |
| 5,108,099 | 4/1992 | Smyth | 273/138 A |
| 5,125,660 | 6/1992 | Stahl | 273/146 |
| 5,145,175 | 9/1992 | Gathman et al. | 273/146 |
| 5,224,708 | 7/1993 | Gathman et al. | 273/146 |
| 5,249,805 | 10/1993 | Neil et al. | 273/237 |
| 5,308,065 | 5/1994 | Bridgeman et al. | 273/85 CP |
| 5,356,140 | 10/1994 | Dabrowski et al. | 463/13 |
| 5,393,057 | 2/1995 | Marnell, II | 273/85 CP |
| 5,395,111 | 3/1995 | Inoue | 273/143 R |
| 5,524,898 | 6/1996 | Pavlovic | 273/292 |
| 5,704,835 | 1/1998 | Dietz, II | 463/20 |
| 5,997,401 | 12/1999 | Crawford | 463/19 |

*Primary Examiner*—Joe H. Cheng
*Assistant Examiner*—John Paradiso
*Attorney, Agent, or Firm*—Synnestvedt & Lechner LLP

[57] ABSTRACT

A method of playing a wagering game against the house which includes the steps of wagering an amount of credits, randomly selecting at least two primary sets of symbols and randomly selecting at least one secondary set of symbols. Each primary set is to have at least two symbols, the secondary set to have at least one symbol. The symbols randomly selected for the secondary set are also included in each primary set. Each symbol is selected from a set of possible symbols. A pay-out is then made based on the combination of symbols in each primary set.

25 Claims, 7 Drawing Sheets

Prior Art

| | | | | | | |
|---|---|---|---|---|---|---|
| PRIMARY SET 1: | S5 | S1 | S2 | | | |
| PRIMARY SET 2: | S5 | S3 | S4 | | | |
| COMMON SECONDARY SET: | S5 | | | | | |

| | | | | | | |
|---|---|---|---|---|---|---|
| PRIMARY SET 1: | S11 | S12 | S1 | S2 | S3 | S4 |
| PRIMARY SET 2: | S11 | S12 | S5 | S6 | S7 | |
| PRIMARY SET 3: | S11 | S12 | S8 | | | |
| PRIMARY SET 4: | S11 | S12 | | | | |
| COMMON SECONDARY SET: | S11 | S12 | | | | |

FIG.4
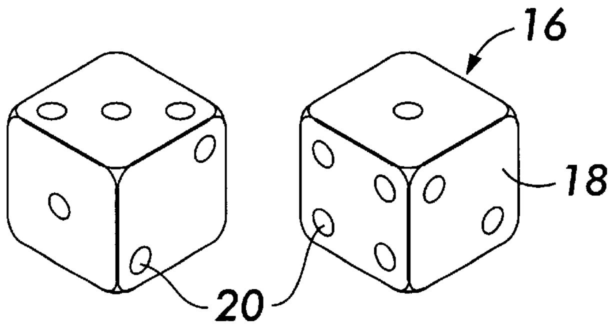
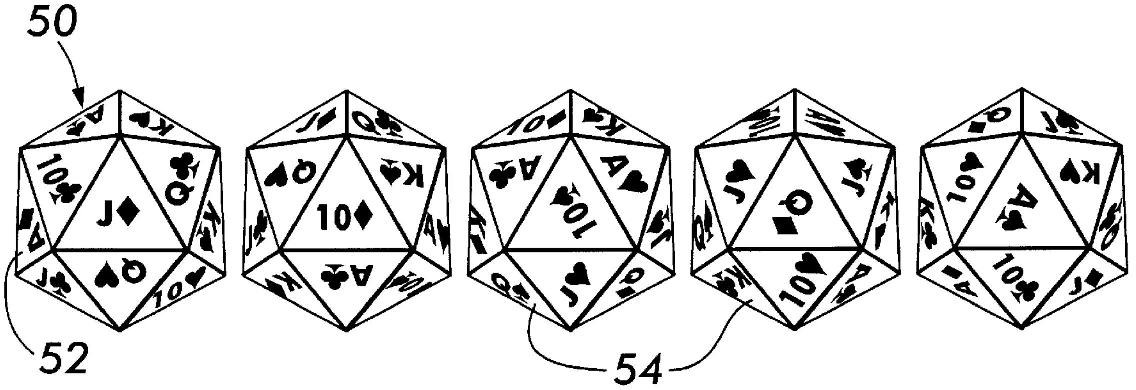
FIG.4A

METHOD OF PLAYING A WAGERING GAME

CROSS-REFERENCE TO RELATED APPLICATION

This application claims the benefit of U.S. Provisional Application 60/040,981 filed Mar. 17, 1997.

BACKGROUND OF THE INVENTION

1. Field of the Invention

The present invention relates to games and more particularly to games used for gambling.

2. Description of Related Art

There are many wagering games used for gambling. Such games should be exciting to arouse players' interest and uncomplicated to be understood easily by a large number of players. Ideally, the games should include multiple opportunities for player skill during the course of the game, yet be able to be played rapidly to wager-resolving outcomes. Exciting play also provides the player with frequent small pay-outs and the opportunity for large jackpot wins.

Wagering games, particularly those intended primarily for play in casinos, should provide players with a sense of participation and control, the opportunity to make decisions, and reasonable odds of winning, even though the odds favor the house. A casino will never act as a bank for a game in which the average player has the advantage over the house. The game must also meet the requirements of the regulatory agencies.

One common apparatus used for gambling is a slot machine. Slot machines select symbols and determine pay-outs based on the combinations of symbols selected. Many slot machines have only one pay line and, therefore, only one primary set of symbols.

Other slot machines display nine symbols in a three-by-three matrix like a tic-tac-toe board. Some of these slot machines have three pay lines forming three primary sets in the horizontal directions but not shared secondary sets.

A slot machine disclosed in U.S. Pat. No. 4,715,604 selects five symbols by spinning three slot wheels as depicted in FIG. 1. The left and right wheels select two symbols, one located above the center and another located below the center while the middle wheel selects one symbol for the center. Players win based on pay-out combinations in the two diagonal directions. This device contains two primary sets of symbols and a common shared secondary set of symbols. However, because the upper left and lower left symbols are on the same wheel, they have a conditional probability of one. Selection of one of the symbols in a particular location on the wheel guarantees selection of the other symbol on the wheel as well. Whenever multiple symbols are selected from the same wheel, the second symbol will always have a conditional probability of one.

Accordingly, one object of the invention is to provide a method of playing a game that uses more than one set of symbols to determine the outcome and payment.

Another object is to provide a method of playing a game that shares one or more symbols between sets.

A further object is to provide a wagering game where symbols are randomly selected, but players have some control over the outcome.

SUMMARY OF THE INVENTION

The present invention provides a new method of playing a wagering game against a house. Broadly, the method includes the step of wagering an amount of credits and then randomly selecting at least two primary sets of symbols. Each of the primary sets is to have at least two symbols, each of these symbols being selected from a set of possible symbols. At least one secondary set of symbols is also randomly selected. The secondary set is to have at least one symbol, each of the symbols in the secondary set to be selected from the possible set of symbols. Each symbol of the secondary set is to be included in all of the primary sets. A pay-out is made based on the combination of symbols in each primary set.

In one embodiment, the set of possible symbols from which the random selections are made is finite and the probability of randomly selecting any of the possible symbols is knowable to a player.

As another preferred embodiment, the conditional probability between any two symbols within each primary set is less than one, and the conditional probability between any two symbols of different primary sets that are not also in the secondary set is less than one. When the conditional probability between any two symbols is less than one, it means that upon the selection of one symbol, it cannot be absolutely predicted what the next symbol will be.

Another embodiment allows the swapping of symbols between the primary sets of symbols so the player can attempt to improve its hand.

BRIEF DESCRIPTION OF THE DRAWINGS

These and other features, aspects, and advantages of the present invention will become better understood with reference to the following description, appended claims, and accompanying drawings where:

FIG. 4 is a perspective view of common dice;

FIG. 4A is a perspective view of twenty-sided dice;

DETAILED DESCRIPTION OF THE INVENTION

The present invention provides a new and novel method of playing a wagering game. Described below are several preferred embodiments, it being understood that the present invention can be adapted to other types of games and game formats.

Figure 2:
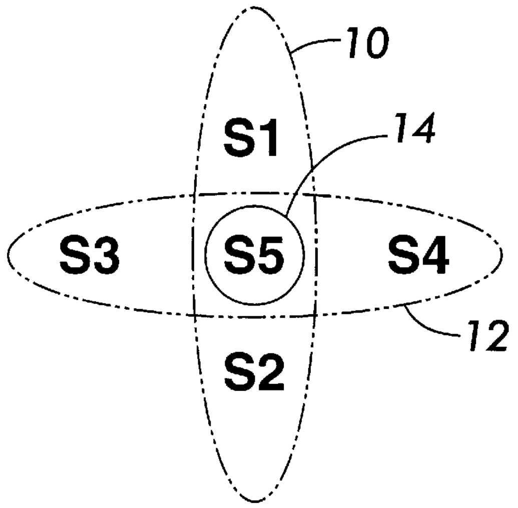
FIG. 2 is a diagram illustrating one embodiment of the invention.

Reference is now made to an embodiment of the invention which uses dice to select symbols (numbers 1 to 6) which are arranged into sets as illustrated in FIG. 2.

The game typically begins with the wagering of an amount of credits, i.e., money, tokens, etc. which is acceptable to the house. The game proceeds with the random selection of at least two primary sets of symbols 10 and 12. Each primary set 10, 12 is to have at least two symbols— symbols S1 and S2 in the primary set 10, and symbols S3 and S4 in the primary set 12.

Each of the symbols are selected from a set of possible symbols. Here, because common dice 16 are used (see FIG. 4), the set of possible symbols 20 are the numbers 1, 2, 3, 4, 5, 6 which appear on each face 18 of each die 16. This is a finite set of symbols, numbers 1 to 6, which are known to the players. Thus the probability of randomly selecting any particular symbol on any given roll, or of obtaining a particular combination of symbols, is determinable and knowable to the players, giving the players some sense of control and fairness.

Symbols S1 and S2 are randomly selected by rolling the die 16 and placed in the first primary set 10 as shown in FIG. 2, and symbols S3 and S4 are randomly selected and placed in the second primary set 12 as shown.

As a further step, a secondary set 14 of at least one symbol is randomly selected from the possible set of symbols 20. Here, one symbol, S5, is selected by rolling the die 16. The symbol S5 is included, i.e., shared with the two primary sets 10, 12. This means that the first primary set 10 includes a total of three symbols—S1, S5, S2; and the second primary set 12 includes a total of three symbols—S3, S5 and S4.

Each roll of the die 16 is independent of any other roll, and thus each selection of a symbol is independent of any other. Moreover, each number 1–6 is equally probable of being randomly selected with each roll.

It is further seen that the conditional probability between any two selected symbols within each primary set, (e.g. in set 10 between S1 and S2, S1 and S5, and S2 and S5) is less than 1, or in this case ⅙. The conditional probability between any two symbols of the different primary sets that are not shared (e.g., S1 and S3, S2 and S4), is also less than 1, or in this case ⅙.

Conditional probability as used herein refers to the probability that selection of one symbol predetermines the selection of another. With dice, there is no relationship between symbols selected in different rolls and thus the conditional probability is equal to the probability of selecting a particular symbol on any given roll, which, in this case is ⅙. Each roll of each die is probabilistically independent of any other roll, and thus selection of one symbol does not correlate or provide any predictive information about any other roll. The odds of randomly selecting a given number always remain the same.

Figure 1:
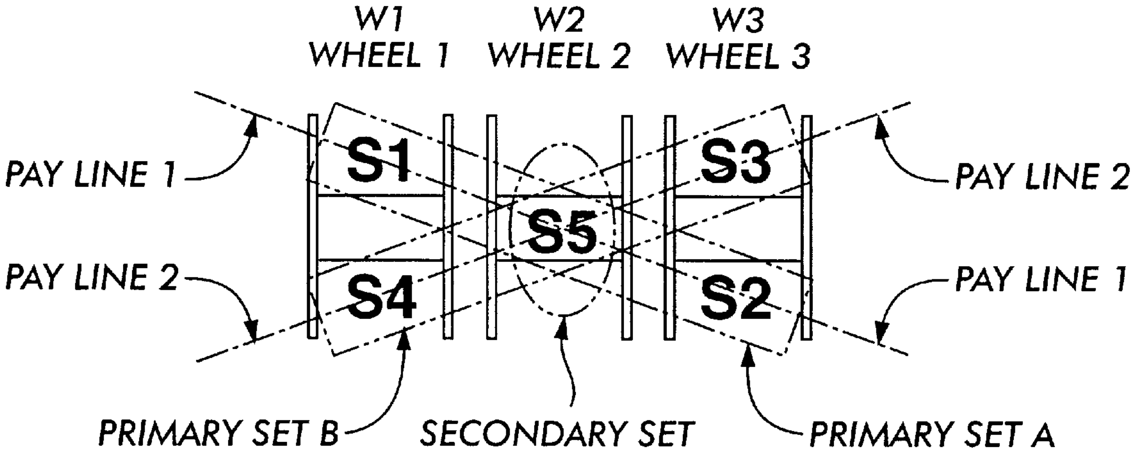
FIG. 1 is a schematic drawing of a slot machine of the type known in the art.

An example of the opposite extreme, conditional probability of 1, is the slot machine illustrated in FIG. 1. This known slot machine provides multiple three-symbol pay-lines, which intersect in the middle. The structure yields two three-symbol combinations (primary sets A and B) which share one symbol (S5) in a secondary set. The symbols forming the combinations are on wheels W1, W2, W3. Therefore, there is a correlation between pairs of symbols on a given wheel, e.g., W1, based on their relative location. As displayed in FIG. 1, each of the exterior wheels W1 and W3 provides one symbol to each primary set. A conditional probability of 1 exists between S1 being in primary set A and S4 being in primary set B. In terms of mathematical notation: Probability (Symbol 4 in set B ¦ Symbol 1 in set A)=1. That is when S1 is in the position indicated in FIG. 1 in primary set A, S4 will always be in primary set B.

The symbols of the present invention can be defined by the following:

$X_{ijk}$ is a symbol $X_{ij}$ of value i in set k i: Value of the symbol with respect to the game (e.g., cherry) A number from 1 to the number of values, V j: Symbol number (iteration) of a given value A number for 1 to $N_i$ such that $N_i$=Number of symbols with value i k: A set to place symbol $X_{ij}$ (e.g., diagonal number one) A number from 1 to total number of sets Therefore:

$$P(X_{ijk}) = \text{Probability symbol } X_{ij} \text{ is in set } k$$

$$\sum_{j=1}^{Ni} P(X_{ijk}) = \text{Probability of value } X_i \text{ is in set } k$$

$$\sum_{i=1}^{V} N_i = \text{Total number of symbols}$$

Provided e≠g, symbol $X_{dg}$ is always a different symbol from $X_{de}$ such that:

$$\sum_{b=1}^{Na} P(X_{abc} \mid X_{def}) \neq \sum_{b=1}^{Na} P(X_{abc} \mid X_{dgf})$$

for at least one possible combination of f, a, and c.

Applying the equations to FIG. 1, each depiction on the wheel is a separate symbol, e.g., if there are two cherries on one wheel, each cherry is considered a separate symbol. In this manner, each separate cherry selected for S1 will have a conditional probability of 1 compared to S4. Using dice to select symbols in the present invention, each symbol is selected independent of any other symbol and therefore each symbol compared to any other has a conditional probability less than 1.

An example of a game where the conditional probabilities between symbols is between 0 and 1 is one using a standard deck of 52 playing cards. The probabilities associated to playing cards are not independent, but are determinable and knowable to the player. The probability of drawing a particular card on the second draw is not independent from what was drawn on the first card in that two of the exact same cards can not be drawn from the same deck. For example, if a game is played using one deck of cards and one primary set contains a non-shared Ace of Spades, no other primary set could contain the Ace of Spades.

As another example, if 50 cards from a common 52 card deck have been previously dealt and known, then the conditional probability between the previously dealt card and the next card (51st) to be dealt is 0.5 since the next card can have only one of two possible symbols. If the remaining two cards are a 10♥ and a K♦, and the previously dealt card was a J♦, then conditional probability for the next selection is 10♥ ¦ J♦=K♦ ¦ J♦=0.5.

Once the secondary set 14 is selected, thereby completing the primary sets 10, 12, the pay-out is determined. The amount of the pay-out can be based on the particular combination of symbols selected in the sets and preferably should provide the house a positive expectation, i.e., to make money over the long term of the game.

In the present embodiment, pay-outs are in two stages. First, the two primary sets 10, 12, are evaluated individually; each three-symbol combination (S5, S1, S2) and (S5, S3, S4) is compared against a list of winning combinations. Secondly, winnings are increased when both three-symbol combinations of the sets 10, 12 win. This comparison is defined as "between primary sets within the game". Another example of this second type of comparison would be to check if the combinations are similar; for example, if both combinations are "Three of a kind", winnings could increase. Bonus rounds, Side Bets, Double Downs can be provided. The various methods of pay-out are potentially limitless. In any pay-out format or schedule, it is preferable to assign pay-out values for each unit of wager (e.g., for each 1 credit wagered) for particular combinations to guarantee that the house wins more than it loses over the life of the game, thereby providing a positive expectation to the house.

Figure 3:
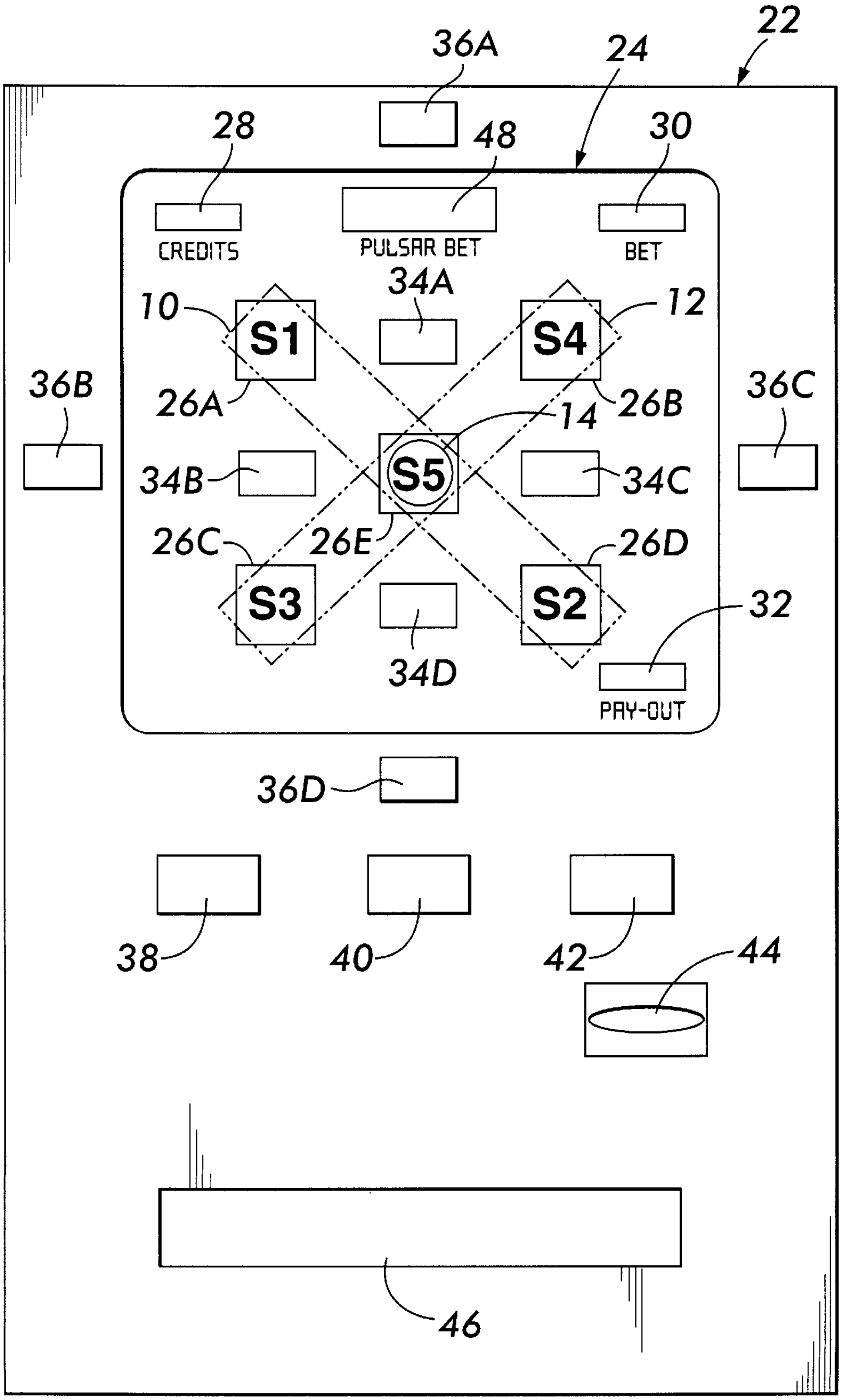
FIG. 3 is a schematic view of a video device for playing another embodiment.

An embodiment of the present invention similar to the previously described embodiment but played with an electronic video device is now described with reference to FIGS. 2, 3, and 4. Illustrated in FIG. 3 is an electronic video device 22 for playing this embodiment called GO FOR CROSS. A video display screen 24 displays video representations of five six-sided dice 16 in screen windows 26A, 26B, 26C, 26D, and 26E. Displays on the screen show the amount of credits the player has entered 28, the amount of credits bet by the player 30 for the particular round of play, and the pay-out of the current combination 32. Additionally, there are four touch screen flip buttons i, 34B, 34C and 34D on the video display screen 24 as well as flip control buttons 36A, 36B, 36C and 36D around the video display 24. Control buttons are provided on the machine to operate the following functions; bet one 38, roll dice 40, and cash out 42.

A player inserts coins or tokens into the coin acceptor or obtains credit from a credit card, debit card, dollar bill, etc. to make the wager. Each coin or token inserted increases the credit display 28. To place a bet, a player activates the bet button 38, subtracting one credit from the credit display 28 and adding one credit to the bet display 30 provided the credit display is greater than zero and the bet display is less than five. The maximum bet for this game is five credits, the minimum or unit wager is one credit.

The roll button starts the game. A randomly generated representation of a six-sided die 16 appears and is displayed in each of the four windows 26A, 26B, 26C and 26D. Six-sided die 16 having symbols (numbers 1–6) as used with the previous embodiment provide the set of possible symbols. All of the six faces have an equal probability of occurring in each window location.

The symbols appearing in the windows 26A–26D are placed in primary sets as illustrated in FIG. 2 by their location. Referring to FIGS. 2 and 3, it is seen that the first selected symbol S1 appears in the window 26A and the second symbol S2 in window 26D as part of the primary set 10, and S3 in window 26C and S4 in window 26B as part of the other primary set 12. The center window 26E is for displaying the randomly selected symbol S5 that will be in the secondary set 14. The lines representing sets 10, 12, and 14 in FIG. 3 are for illustration purposes only and would not necessarily be shown on the video device 22.

The player may choose to switch symbols in one set with those in another set. In this particular embodiment, the player inspects the hand of symbols and is permitted to switch the positions of the dice by pressing any of the touch screen flip buttons 34A–34D, or any of the physical buttons outside of the screen 36A–36D. Flip buttons 34A and 36A switch the positions of the dice located in 26A and 26B, flip buttons 34C and 36C switch the positions of the dice located in 26B and 26D, flip buttons 34B and 36B switch the positions of the dice located in 26A and 26C, and flip buttons 34D and 36D switch the positions of the dice located in 26C and 26D. A player is permitted to touch the flip buttons as many times as desired.

Once a player has made all decisions the player presses the roll button 40 which will generate a new die symbol S5 at random for the center die window 26E of the secondary set 14.

The wager is then resolved. The player receives a score based on the three dice combinations in the two primary sets 10, 12. The possible three dice combinations are either three-of-a-kind (all the same number), a straight (e.g., 3-4-5), or a loss. Three-of-a-kinds score five points, straights score one point and losses score zero points. If a winning combination is scored in both directions, the player's final score is calculated by adding the scores from both primary sets 10, 12 and then multiplying the sum by two. Therefore, a player who scores a three-of-a-kind in one set 10 and a straight in the other set 12 receives 2×(5+1) or 12 points. Table 1 below represents the set of pay-out values (points) for all possible combinations.

TABLE 1

PAYOUT VALUE PER UNIT OF WAGER

| | Combo 1 | | |
|---|---|---|---|
| Combo 2 | Three of a Kind | Straight | Loss |
| Three of a Kind | 20 | 12 | 5 |
| Straight | 12 | 4 | 1 |
| Loss | 5 | 1 | 0 |

Once the center die 26E appears, the computer calculates the players pay-out by multiplying the appropriate score by the amount of wager shown in the bet display 30 and shows the value in the pay-out display 32. Additionally, the credit display 28 increases by the corresponding pay-out.

Once the center die is positioned and pay-out calculated, the game is over. If the Credits display reads a number greater than one, the player can begin a new game by pressing the bet button 38. The bet button will clear all dice images, reset the pay-out display 32 to zero, and adjust the bet display 30 and credit displays 28 appropriately.

At any point, the player has the option to collect all credits. The activation of the cash out button 42 causes gaming tokens equal to the value of the credits display 28 to be dispensed from a hopper inside the machine (not shown) into the tray 46.

The pay-out values are chosen to provide the desired expectation of winnings to the house over the life of the game. The house expectation can be defined with the following formulas:

HouseExpect: Long-run expectation of the house $PlayerTotExpLoss_i$: $Player_i$'s total expected loss $PlayerExpLoss_i$: $Player_i$'s expected loss per game $NumGames_i$: Number of games played by $Player_i$;

$Win_i$: $Player_i$'s average winning per game $Bet_i$: $Player_i$'s average bet per game $$PlayerExpLoss_i = Bet_i \times (1.0 - (Win_i / Bet_i))$$

$$PlayerTotExpLoss_i = PlayerExpLoss_i \times NumGames_i$$

$$HouseExpect = \Sigma_i (PlayerTotExpLoss)_i$$

A numerical example with three players:

| $Player_1$ | $Bet_1$ | $Win_1$ | $NumGames_1$ | $PlayerExpLoss_1$ | Player-$TotExpLoss_1$ |
|---|---|---|---|---|---|
| 1 | 1.00 | 0.90 | 100 | 1.00 × (1.0 − (.90/1.00)) = 0.10 | 0.10 × 100 = 10.00 |
| 2 | 1.00 | 1.01 | 200 | 1.00 × (1.0 − (1.01/1.00)) = −.01 | −.01 × 200 = −2.00 |
| 3 | 1.00 | 0.94 | 300 | 1.00 × (1.0 − (.94/1.00)) = 0.06 | 0.06 × 300 = 18.00 |

HouseExpect=10.00−2.00+18.00=26.00

A positive expectation for the house would guarantee the house makes money over the long term. The present game, with the pay-out values shown in Table 1, is believed to yield a positive expectation for the house over the long term even where the player always makes decisions to maximize his or her own expectation.

Another embodiment is now illustrated with reference to FIGS. 2, 3 and 4A. This is another game using an electronic video device 22 as illustrated in FIG. 3, and is called PULSAR™.

The game is played in a similar manner as described above for GO FOR CROSS with the exception that twenty-sided dice 50 (FIG. 4A) are generated and displayed in the windows 26A, 26B, 26C, 26D and 26E for the symbols S1 to S5 instead of the conventional six-sided dice 16.

A twenty-sided die 50 suitable for use with the present invention is fully disclosed in U.S. Pat. No. 5,145,175 which is hereby incorporated by reference and illustrated herein in FIG. 4A. Each die 50 has twenty sides, each side having a face 52 which is marked with a symbol 54.

Each die 50 provides the set of possible symbols which here is a set of multi-dimensional symbols that have an equal and determinable probability of selection. The complete set of possible symbols 54 appearing on each twenty-sided die 50 is shown below.

| | | | |
|---|---|---|---|
| A♠ | A♥ | A♣ | A♦ |
| K♠ | K♥ | K♣ | K♦ |
| Q♠ | Q♥ | Q♣ | Q♦ |
| J♠ | J♥ | J♣ | J♦ |
| 10♠ | 10♥ | 10♣ | 10♦ |

Multi-dimensional means each symbol 54 has two or more distinct dimensions. Each symbol is marked by a value of one dimension combined with a value for each additional dimension. In the present embodiment, each value in each dimension is distinct in that it appears only once in that dimension. Further, all values within a dimension are equally probable and as a result all symbols are equally probable. A complete set means one having all possible symbols i.e., all combinations of values.

In the illustrated embodiment, each die 50 has twenty faces 52, which are marked with the playing card symbols 54 in a two-dimensional matrix. One dimension consists of four suit values (spades, hearts, clubs and diamonds) and the other dimension consists of five rank values (A—ACE, K—KING, Q—QUEEN, J—JACK, and 107465 —TEN). It is understood that the rank letters, e.g. "J" are synonymous with the ranks, e.g. "Jack". This 4×5 two-dimensional matrix of symbols provides a finite set of twenty possible symbols. As each of the twenty possible symbols appears on only one of the twenty faces 52, each die 50 contains a complete set of the twenty symbols. Each value in each dimension is equally probable within the dimension, i.e., each suit value is equally probable within the dimension having four suits and each rank value is equally probable within the dimension having five rank values. All symbols 54 of the complete set are equally probable of being selected with each roll of the die 50.

It is further seen that each symbol is always selected with replacement. Replacement means that with each roll, each randomly selected symbol is always selected from the full set of symbols on the die 50. Thus the outcome of one roll of a die 50 has absolutely no effect on the outcome of other or subsequent symbols selected. Dice inherently select symbols with replacement since all possible symbols remain on each die for each new roll. Thus the conditional probability between any two symbols determined by rolling the dice 50 is 1/20, equal to the probability of selecting a particular symbol in any given roll. If the symbols are provide by a deck of cards, then each symbol is selected without replacement unless a new complete deck is used for each selection. Since the set of twenty possible symbols is finite and knowable to the players, the probability of randomly selecting any particular symbol or combination of symbols is also knowable to the player.

The maximum bet in this embodiment is five credits, the minimum is one credit. The roll button 40 starts the game. A randomly generated representation of a twenty-sided die 50 appears in each of the four windows 26A, 26B, 26C and 26D in the two primary sets 10, 12 as previously discussed.

The player inspects the hand and is permitted to swap the positions of the dice by pressing any of the touch screen flip buttons.

In addition to rearranging the dice, the player may also decide to place a PULSAR, or Bonus bet. The PULSAR bet must be an amount equal to the original wager. A player indicates this bet by pressing the bet button 38. This button will activate the PULSAR bet display 38. The bet button 48 may be pressed again if the player wishes to remove the PULSAR bet. This causes the Pulsar bet display to disappear and increase the player's credits 28 by the amount in the Bet display 30.

Once a player has made all swap dice and PULSAR decisions, the player indicates so by pressing the roll button 40 which will generate a die symbol S5 at random for the center window 26E which is included in the secondary set 14 and included in each primary set 10, 12. The player receives a score based on the three dice combinations in the two primary sets 10, 12. The possible three dice combinations are either TIBSTER (all dice depicting the same exact face), a Straight Flush, Three-of-a-Kind, Flush or a loss. A TIBSTER scores twelve points, Straight Flush scores five points, Three-of-a-Kind scores two points, and loss scores zero points. If a winning combination is scored in both primary sets 10, 12 the player's score is calculated by multiplying the two scores of each winning combination. These scores have been tabulated in Table 2 below. Therefore, a player who scores a three-of-a-kind in one direction (Combination 1) and a straight flush in the other (Combination 2) receives 2×5 or 10 points as indicated in Table 2.

TABLE 2

| | Combo 1 | | | | |
|---|---|---|---|---|---|
| Combo 2 | Tibster | Straight Flush | Three-of-a-Kind | Flush | Loss |
| Tibster | 144 | 60 | 24 | 12 | 12 |
| Straight Flush | 60 | 25 | 10 | 5 | 5 |
| Three-of-a-Kind | 24 | 10 | 4 | 2 | 2 |
| Flush | 12 | 5 | 2 | 1 | 1 |
| Loss | 12 | 5 | 2 | 1 | 0 |

Figure 5:
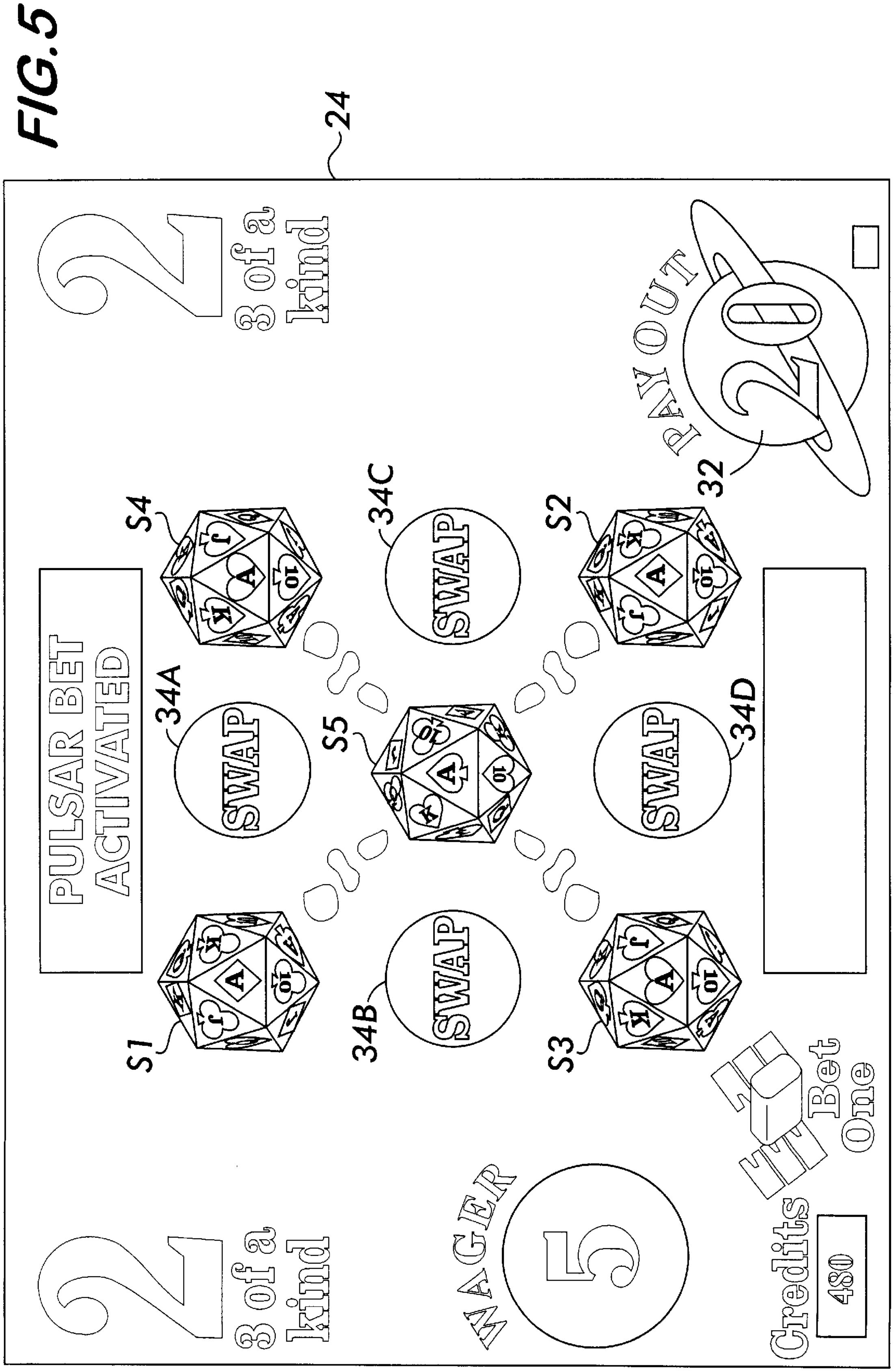
FIG. 5 is an illustration of a video screen for an embodiment of the present invention.

Illustrated in FIG. 5 is a video screen 24 for a completed round of play. A Three-of-a-Kind has been generated in both primary sets 10 and 12 for a total score of 4. Since the basic unit wagered is 1 credit for which the points apply, the score is then multiplied by the amount wagered for a pay-out value of 20 credits (4×5 credits). If one credit is equivalent to $1.00, then a $5.00 wager returned to the player $20.00. The video display 24 also shows that the PULSAR bet was activated which is discussed below.

Figure 6:
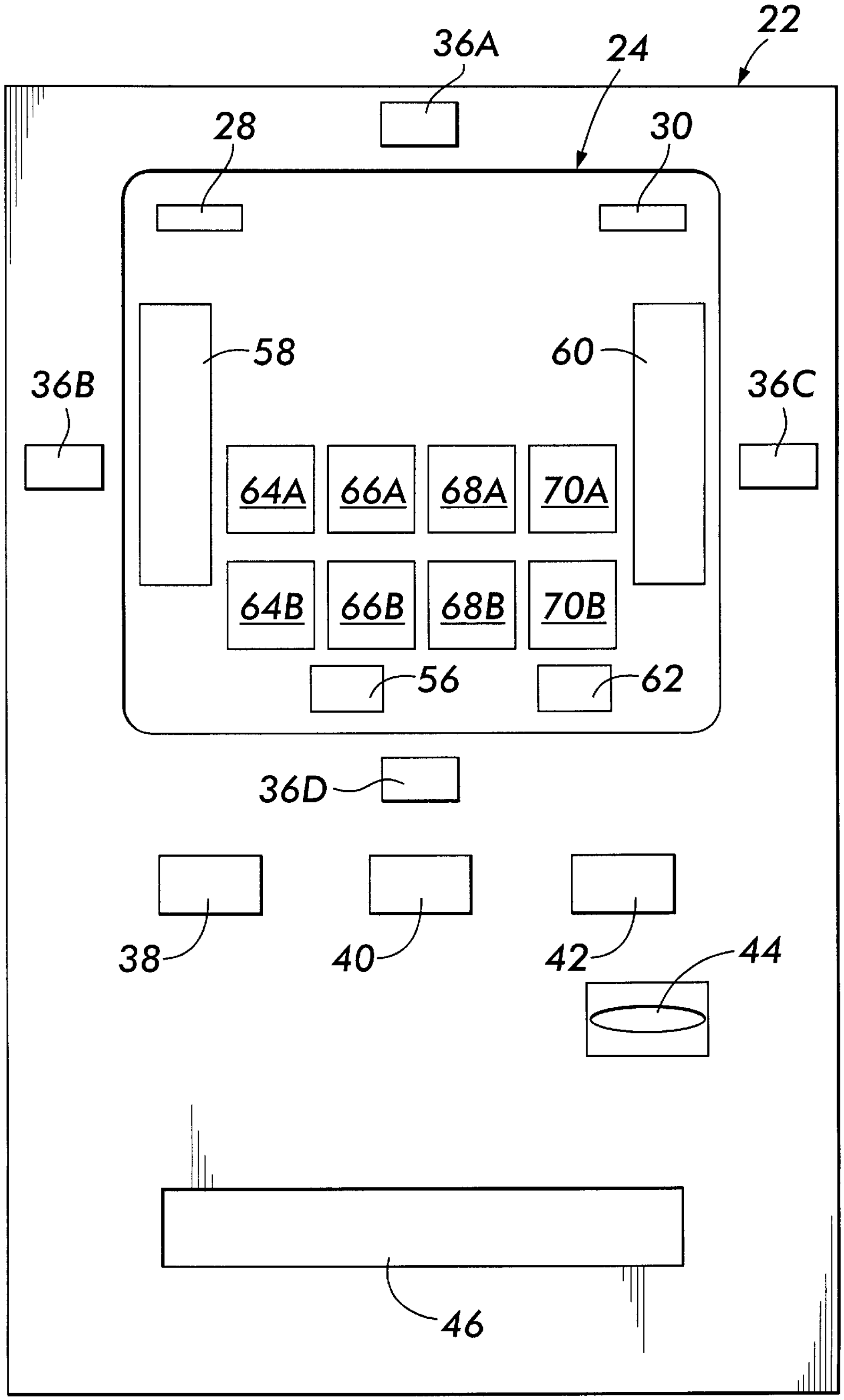
FIG. 6 is a schematic view of the video device of FIG. 3 showing a bonus round display.

The player enters the PULSAR bonus round if the PULSAR bet was made and a winning combination is scored in both primary sets 10, 12. The video display screen 24 changes to the PULSAR bonus round as depicted in FIG. 6. The values in the credits display 28, and the bet display 30 will equal their corresponding values from the previous round shown in FIG. 3. The score display 56 contains the score as determined from the first round of play while both the flush multiplier 58 and the pair multiplier 60 initially equal one. The final score 62 is calculated by multiplying the value of the score by the two multipliers 58 and 60.

The bonus round begins when the player presses the roll button 40. The player initiates the random selection of symbols from twenty-sided dice 50 which appear in display boxes 64A and 64B. If the symbols of the two dice match in suit, the flush multiplier 58 increases, or if they match in rank, the pair multiplier 60 increases. In the event that both of the images depict the same exact symbol, both of the multipliers 58 and 60 increase. It is seen that there are two multipliers; one for flushes 58 and one for pairs of ranks 60. Each multiplier increases independently of the other. The player repeats this process three more times to try to create matches in the grouped display boxes (66A and 66B), (68A and 68B), and (70A and 70B). The flush multiplier increases with each additional flush match, and the pair multiplier increases with each additional pair match. Each multiplier will increase from 1 to 2, from 2 to 5, from 5 to 15, and from 15 to 150 with each successive match. Once images are generated for the boxes 70A and 70B the total score 62 is calculated and the round ends. Score 62 is calculated by multiplying the pre-bonus round score by both multipliers.

Figure 7:
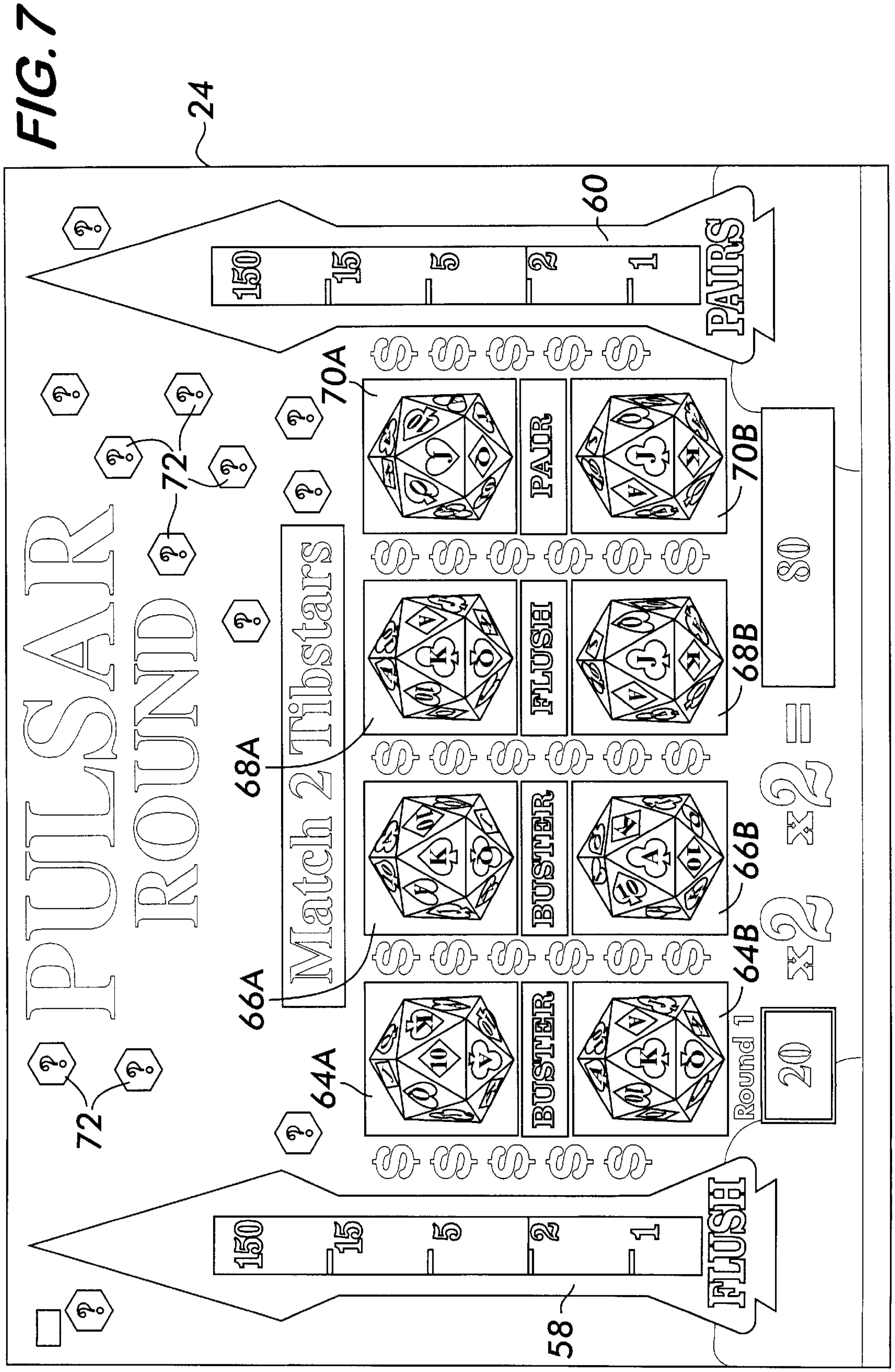
FIG. 7 is an illustration of a video screen for the embodiment of FIG. 6.

A complete PULSAR round succeeding the round shown in FIG. 5 is illustrated in FIG. 7. The player initiated the random selection of each die symbol by choosing from the many question marks 72. One Flush was made thereby increasing the flush multiplier 58 from 1 to 2; one pair was made thereby increasing the pair multiplier 60 from 1 to 2. Since the PULSAR round began with 20 credits won in the previous round of FIG. 5, the 20 credits are multiplied by both multipliers for a total pay-out of 80 credits (20×2×2), or $80.00 if each cash credit is equivalent to $1.00.

At the completion of a game, the computer calculates the player's pay-out which is shown in the pay-out display. Additionally, the credit display 28 increases by the corresponding pay-out. If the Credits display reads a number greater than one, the player can begin a new game by pressing the bet button. The bet button will clear all of the dice images reset the pay-out display to zero, and adjust the bet display 30 and credit displays 28 appropriately.

At any point, the player has the option to collect all credits. The activation of the cash out button 42 causes gaming tokens to be dispensed from a hopper inside the machine (not shown) into the tray 46. The number of coins dispenses into the tray will be equal to the value of the credits display 28 which will subsequently set itself to zero.

This game has a positive expectation for the house.

Figure 8:
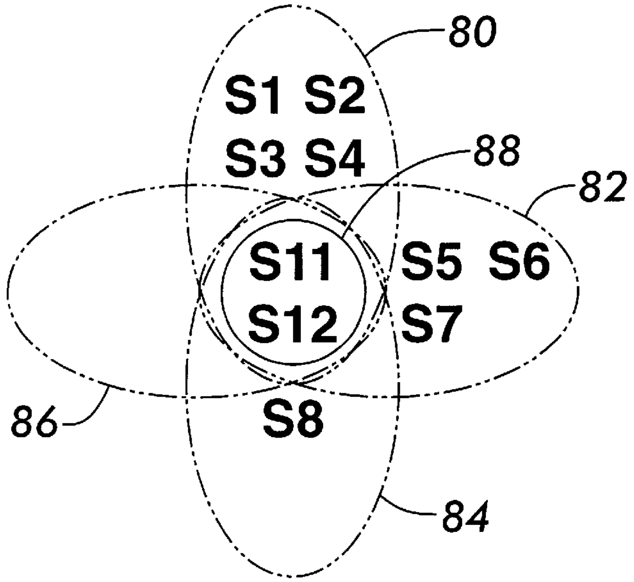
FIG. 8 is a diagram illustrating another embodiment having four primary sets of an unequal number of symbols.

It is understood that the present invention can be applied to other formats such as games that use more than two primary sets of symbols, and to primary sets that have more or fewer than three symbols. For example, an illustration of a game having four primary sets of unequal size is shown in FIG. 8. Here there are four primary sets and one secondary set:

First primary set 80 includes symbols S11, S12, S1, S2, S3, S4;

Second primary set 82 includes symbols S11, S12, S5, S6, S7;

Third primary set 84 includes symbols S11, S12, S8; and

Fourth primary set 86 includes symbols S11, S12.

The secondary set 88 includes symbols S11 and S12.

Here, the four primary sets 80, 82, 84, 86 share the two symbols S11 and S12 with the secondary set 88. Since the fourth primary set 86 has no symbols of its own, its symbols are those it shares with the secondary set 88. Thus it is possible for a primary set to equal the number of symbols in the secondary set, although it is preferable that there be no more than one such primary set. As with the previously discussed embodiments, symbols can be randomly selected for each primary set, swapped among primary sets, and then the two secondary symbols can be randomly selected. Payouts could be based on particular combinations in each primary set. Thus the symbols of the secondary set could be looked at for purposes of a pay-out.

It is also understood that the present invention can include other means for calculating a Bonus, or PULSAR, pay-out.

Other variations or modifications to this game will be apparent to those skilled in the art. Accordingly, the invention should not be limited by the foregoing description, but rather should only be defined by the following set of claims.

What is claimed:

1. A method of playing a wagering game against a house, comprising the steps of:

(a) wagering an amount of credits;

(b) randomly selecting at least two primary sets of symbols, each of said primary sets to have at least two symbols, each of said symbols being selected from a set of possible symbols, said set of possible symbols being finite and the probability of randomly selecting any of said possible symbols being knowable to a player;

(c) randomly selecting at least one secondary set of symbols, said secondary set to have at least one symbol, each said symbol of said secondary set being selected from said possible set of symbols and being included in all said primary sets;

(d) wherein the conditional probability between any two symbols within each primary set is less than 1, and the conditional probability between any two symbols of different primary sets that are not also in the secondary set is less than 1; and (e) making a payout based on the combination of symbols in at least one of said primary sets.

2. A method according to claim 1 wherein step (b) further includes the steps of:

(b)(i) choosing which of said symbols of one of said primary sets to swap with said symbols of another of said primary sets; and (b)(ii) upon choosing to swap symbols in step (b)(i), swapping the symbols chosen in step (b)(i).

3. A method in accordance with claim 2 wherein steps (b)(i) and (b)(ii) are completed before beginning step (c).

4. A method according to claim 3 wherein said possible set of symbols consist of multi-dimensional symbols.

5. A method according to claim 3 wherein each said primary set is to include three symbols, and there being no more than one said secondary set which is to have no more than one symbol.

6. A method according to claim 5 having no more than two said primary sets.

7. A method in accordance with claim 4 wherein said multi-dimensional symbols include one dimension having at least three distinct values and another dimension having at least four distinct values.

8. A method according to claim 7 wherein said four values include Spade, Heart, Club, and Diamond and said five values include Ace, King, Queen, Jack and 10.

9. A method according to claim 3 wherein the randomly selected symbols in steps (b) and (c) are selected with replacement.

10. A method according to claim 3 wherein the symbols selected in steps (b) and (c) are displayed such that all primary sets appear substantially as lines intersecting each other at a point, said secondary symbols being displayed substantially at said point.

11. A method according to claim 3 wherein payout values for all possible combinations of symbols in each primary set are predetermined to provide a positive return to the house over the long term, step (e) being further based on the amount of the wager.

12. A method according to claim 3 wherein steps (b) and (c) are carried out by an electronic video device.

13. A method according to claim 3 wherein step (b) is carried out with multiple dice, said dice having multiple faces, each of said faces having one symbol.

14. A method in accordance with claim 13 wherein said dice are displayed on a video device.

15. A method according to claim 13 wherein said dice include a die having at least 12 faces.

16. A method in accordance with claim 3 wherein all symbols of said probable set of symbols are equally probable.

17. A method according to claim 3 wherein said selected symbols in steps (b) and (c) are displayed as symbols appearing on playing cards.

18. A method according to claim 1 wherein said possible set of symbols include multi-dimensional symbols.

19. A method in accordance with claim 18 wherein said multi-dimensional symbols include one dimension having at least three distinct values and another dimension having at least four distinct values.

20. A method according to claim 1 having no more than one said secondary set of symbols.

21. A method of playing a wagering game against a house, comprising the steps of:

(a) wagering an amount of credits;

(b) randomly selecting at least two primary sets of symbols, each of said primary sets to have at least two symbols, each of said symbols being selected from a set of possible symbols;

(c) choosing which of said symbols of one of said primary sets to swap with said symbols of another of said primary sets;

(d) upon choosing to swap symbols in step (c), swapping the symbols chosen;

(e) randomly selecting at least one of said possible symbols for a secondary set of symbols, each of said symbols of said secondary set being included in all said primary sets; and (f) making a payout based on the combination of symbols in at least one of said primary sets.

22. A method in accordance with claim 21 wherein the conditional probability between any two symbols within each primary set is less than 1, and the conditional probability between any two symbols of different primary sets that are not also in the secondary set is less than 1.

23. A method in accordance with claim 21 wherein said set of possible symbols is finite and the probability of randomly selecting any of said possible symbols is knowable to a player.

24. A method in accordance with claim 21 having a bonus round comprising the following steps:

(g) randomly selecting two symbols from said set of possible symbols, and (h) said payout further based on the combination of symbols selected in step (g).

25. A method according to claim 21 wherein said possible set of symbols include multi-dimensional symbols.

* * * * *